(12) United States Patent
Tsukano

(10) Patent No.: US 10,620,891 B2
(45) Date of Patent: Apr. 14, 2020

(54) CONTROL APPARATUS AND COMPUTER-READABLE RECORDING MEDIUM

(71) Applicant: Konica Minolta, Inc., Chiyoda-ku, Tokyo (JP)

(72) Inventor: Toshiki Tsukano, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/181,837

(22) Filed: Nov. 6, 2018

(65) Prior Publication Data

US 2019/0146735 A1 May 16, 2019

(30) Foreign Application Priority Data

Nov. 15, 2017 (JP) ................. 2017-219579

(51) Int. Cl.
*G06F 3/12* (2006.01)
*G06K 15/02* (2006.01)

(52) U.S. Cl.
CPC .......... *G06F 3/1254* (2013.01); *G06F 3/1204* (2013.01); *G06K 15/027* (2013.01); *G06K 15/1878* (2013.01)

(58) Field of Classification Search
CPC .............. G06K 15/027; G06K 15/1878; G06F 3/1204; G06F 3/1256; G06F 3/1208; G06F 3/1205; G06F 3/1285
See application file for complete search history.

(56) References Cited

FOREIGN PATENT DOCUMENTS

JP 2000-013628 1/2000
JP 2012-235405 11/2012

*Primary Examiner* — Christopher Wait
(74) *Attorney, Agent, or Firm* — BakerHostetler

(57) ABSTRACT

A control apparatus receives designation of one or more colors to be adjusted in a printed image and input of one or more adjustment values of the designated colors. The printed image is an image output by a printer based on printing image data. The control apparatus makes a color adjustment of the printing image data based on the designated colors and the input adjustment values. The control apparatus includes a hardware processor which makes a determination as to whether or not a number of the colors designated is equal to or greater than a predetermined threshold, and if it is determined that the number of the colors designated is equal to or greater than the predetermined threshold, recommends adjusting color reproducibility of the printer.

9 Claims, 5 Drawing Sheets

CONTROL APPARATUS AND COMPUTER-READABLE RECORDING MEDIUM

BACKGROUND

1. Technical Field

The present invention relates to a control apparatus and a computer-readable recording medium.

2. Description of the Related Art

In a prior art, when a user visually checks a printed image output by a printer and finds a color to be corrected, he/she makes a designated color adjustment by manually designating the color on a preview image of a job and inputs an adjustment value.

With regard to techniques related to the designated color adjustment, for example, Patent Document 1 (JP 2012-235405A) describes a technique of displaying colors to be affected by adjustment of a color designated by a user, allowing the user to select a desired color to be excluded from the influence range and excluding the selected color from the influence range. For another example, Patent Document 2 (JP 2000-13628A) describes a method that involves determining a correction of input image data based on a user correcting operation that specifies a color to be corrected, a target color and an area to be corrected and correcting a color conversion table according to the determined correction.

In designated color adjustment, a user is required to repeat manually inputting an adjustment value and printing an image until the designated color matches a target color desired by the user. Even when the color reproducibility of a printer is not correctly adjusted, a user sometimes takes a lot of effort to adjust the color by designated color adjustment. Such a process takes a lot of labor and time.

SUMMARY

It is an object of the present invention to prevent a user from making an unfruitful designated color adjustment so as to reduce the labor and the time for designated color adjustment.

To achieve at least one of the abovementioned objects, according to one aspect of the present invention, a control apparatus receives designation of one or more colors to be adjusted in a printed image and input of one or more adjustment values of the designated colors, the printed image being an image output by a printer based on printing image data, and makes a color adjustment of the printing image data based on the designated colors and the input adjustment values, the control apparatus including:

a hardware processor which makes a determination as to whether or not a number of the colors designated is equal to or greater than a predetermined threshold, and if it is determined that the number of the colors designated is equal to or greater than the predetermined threshold, recommends adjusting color reproducibility of the printer.

According to another aspect of the present invention, a control apparatus receives designation of one or more colors to be adjusted in a printed image and input of one or more adjustment values of the designated colors, the printed image being an image output by a printer based on printing image data, and makes a color adjustment of the printing image data based on the designated colors and the input adjustment values, the control apparatus including:

a hardware processor which makes a determination as to whether there is a tendency in the adjustment values of the designated colors, and if it is determined that there is a tendency in the adjustment values of the designated colors, recommends adjusting a tone curve of the printer.

According to still another aspect of the present invention, a control apparatus receives designation of one or more colors to be adjusted in a printed image and input of one or more adjustment values of the designated colors, the printed image being an image output by a printer based on printing image data, and makes a color adjustment of the printing image data based on the designated colors and the input adjustment values, the control apparatus including:

a hardware processor which makes a determination as to whether adjustment influence ranges of the designated colors overlap each other, and if it is determined that the adjustment influence ranges of the designated colors overlap each other, recommend returning to an image editing software to correct the printing image data.

According to still another aspect of the present invention, a computer-readable recording medium stores a program for a computer of a control apparatus which receives designation of one or more colors to be adjusted in a printed image and input of one or more adjustment values of the designated colors, the printed image being an image output by a printer based on printing image data, and which makes a color adjustment of the printing image data based on the designated colors and the input adjustment values, the program making the computer function as:

a determiner which makes a determination as to whether or not the number of the colors designated is equal to or greater than a predetermined threshold; and a recommender which recommends adjusting a color reproducibility of the printer if it is determined by the determiner that the number of the colors designated is equal to or greater than the predetermined threshold.

According to still another aspect of the present invention, a computer-readable recording medium stores a program for a computer of a control apparatus which receives designation of one or more colors to be adjusted in a printed image and input of one or more adjustment values of the designated colors, the printed image being an image output by a printer based on printing image data, and which makes a color adjustment of the printing image data based on the designated colors and the input adjustment values, the program making the computer function as:

a determiner which makes a determination as to whether there is a tendency in the adjustment values of the designated colors; and a recommender which recommends adjusting a tone curve of the printer if it is determined by the determiner that there is a tendency in the adjustment values of the designated colors.

According to still another aspect of the present invention, a computer-readable recording medium stores a program for a computer of a control apparatus which receives designation of one or more colors to be adjusted in a printed image and input of one or more adjustment values of the designated colors, the printed image being an image output by a printer based on printing image data, and which makes a color adjustment of the printing image data based on the designated colors and the input adjustment values, the program making the computer function as:

a determiner which makes a determination as to whether adjustment influence ranges of the designated colors overlap with each other; and a recommender which recommends returning to an image editing software to correct the printing image data if it is determined by the determiner that the adjustment influence ranges of the designated colors overlap with each other.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Configuration of Color Adjustment System 100

Figure 1:
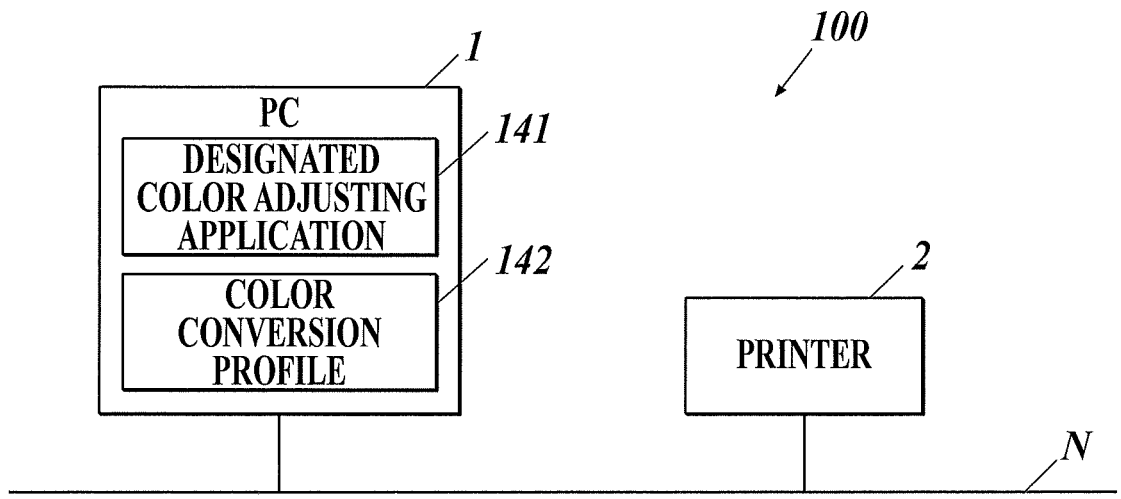
FIG. 1 illustrates an example of the overall configuration of a color adjustment system according to a first embodiment.

FIG. 1 illustrates an example of the overall configuration of a color adjustment system 100 according to a first embodiment of the present invention.

As illustrated in FIG. 1, the color adjustment system 100 of the first embodiment incudes a PC (Personal Computer) 1 and a printer 2 that are connected to each other via a communication network N such as LAN (Local Area Network).

Configuration of PC 1

The PC 1 is a control apparatus that makes a designated color adjustment of printing image data according to a user operation and outputs the adjusted image data to the printer 2 to print the image. The PC 1 also controls the printer 2 to make a variety of adjustments.

Figure 2:
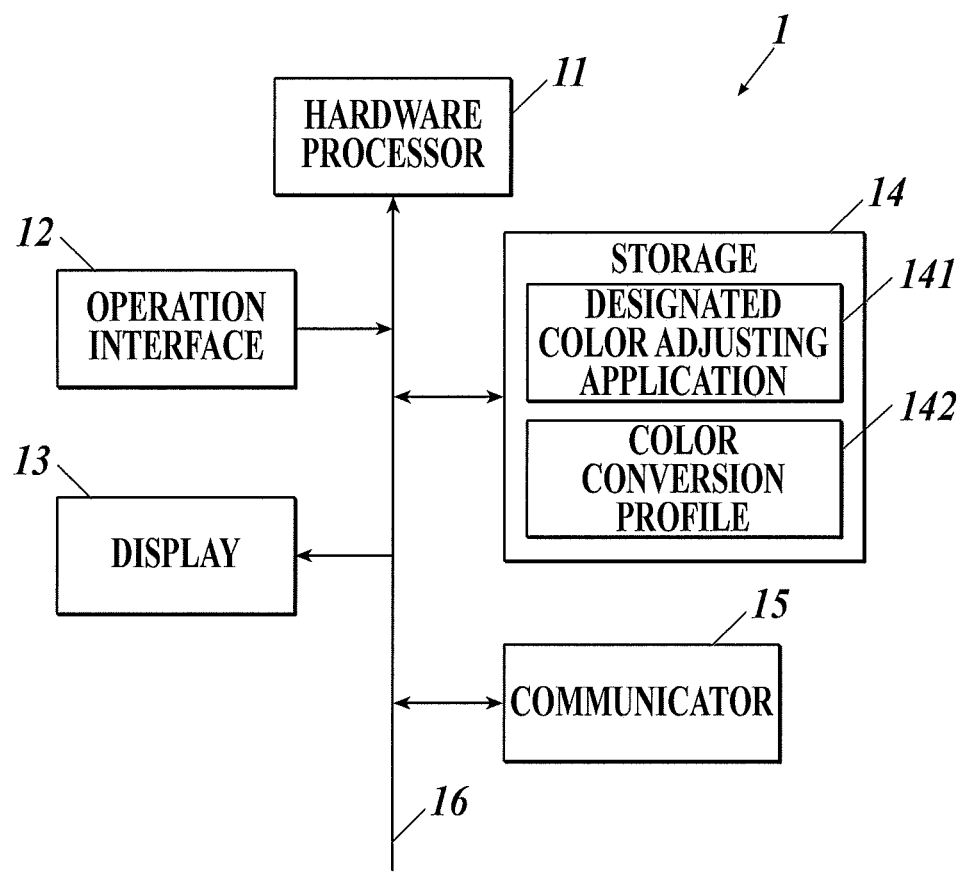
FIG. 2 is a block diagram of the functional configuration of a PC in FIG. 1.

FIG. 2 is a block diagram of the functional configuration of the PC 1. As illustrated in FIG. 2 the PC 1 includes a hardware processor 11, an operation interface 12, a display 13, a storage 14, a communicator 15 and the like, which are connected to each other via a bus 16.

The hardware processor 11 includes a CPU (Central Processing Unit), a RAM (Random Access Memory) and the like. According to a user operation on the operation interface 12, the CPU of the hardware processor 11 reads a system program or a variety of processing programs stored in the storage 14, develops the read programs on a RAM and executes a variety of processing according to the developed programs.

For example, the hardware processor 11 functions as a determiner or a controller when it executes designated color adjustment processing (see FIG. 5) in cooperation with a designated color adjusting application 141. The hardware processor 11 also functions as a recommender in cooperation with the display 13.

The operation interface 12 includes a keyboard including a cursor key, character input keys, a variety of function keys and the like, and a pointing device such as a mouse. The operation interface 12 outputs a operation signal input through a key operation or a mouse operation to the hardware processor 11.

The display 13, which includes an LCD (Liquid Crystal Display), displays a variety of windows and processing results according to an instruction of the CPU 11.

The storage 14 includes a storage device such as a non-volatile semiconductor memory and a hard disk. In the storage 14, a variety of programs to be executed by the hardware processor 11, parameters required for executing the programs, data such as processing results, and the like are stored.

In the embodiment, the designated color adjusting application 141 for performing designated color adjustment processing (described below), a program for performing variety of image processing such as color conversion, rasterizing and screening (halftoning) on printing image data and outputting it to the printer 2, and the like are stored in the storage 14.

Further, a color conversion profile 142 which is used for converting the color of printing image data according to the color reproduction characteristics of the printer 2 is also stored in the storage 14. The image data is composed of values of C (cyan), M (magenta), Y (yellow) and K (black) color components.

The color conversion profile 142 will be described.

In general, color systems such as CMYK and RGB depend on the color reproduction characteristics of an input or output device. For example, when an image of a CMYK image data is printed with different printers, it is reproduced in different colors depending on the printers. To adjust the color reproduction characteristics of an input or output device, color conversion processing is performed on printing image data. The color conversion profile 142 is used for this color conversion processing, which is defined according to ICC (International Color Consortium). In the embodiment, the color conversion profile 142 is composed of, for example, a profile that describes the correspondence relationship of CMYK values of printing image data to color values in the L*a*b* common color space, and a profile that describes correspondence relationship of colors in the L*a*b* common color space to CMYK values of the printer 2.

In the storage 14, image data edited by an image editing application and image data sent from an external device through the communicator 15 are stored.

The communicator 15, which includes a communication control card such as a LAN (Local Area Network) card, sends and receives data to and from an external device such as the printer 2 via the communication network N.

Configuration of Printer 2

The printer 2 prints an image on a sheet by using output colors of cyan, magenta, yellow and black color components based on image data (CMYK values) that has been color-converted and received from the PC 1.

Figure 3:
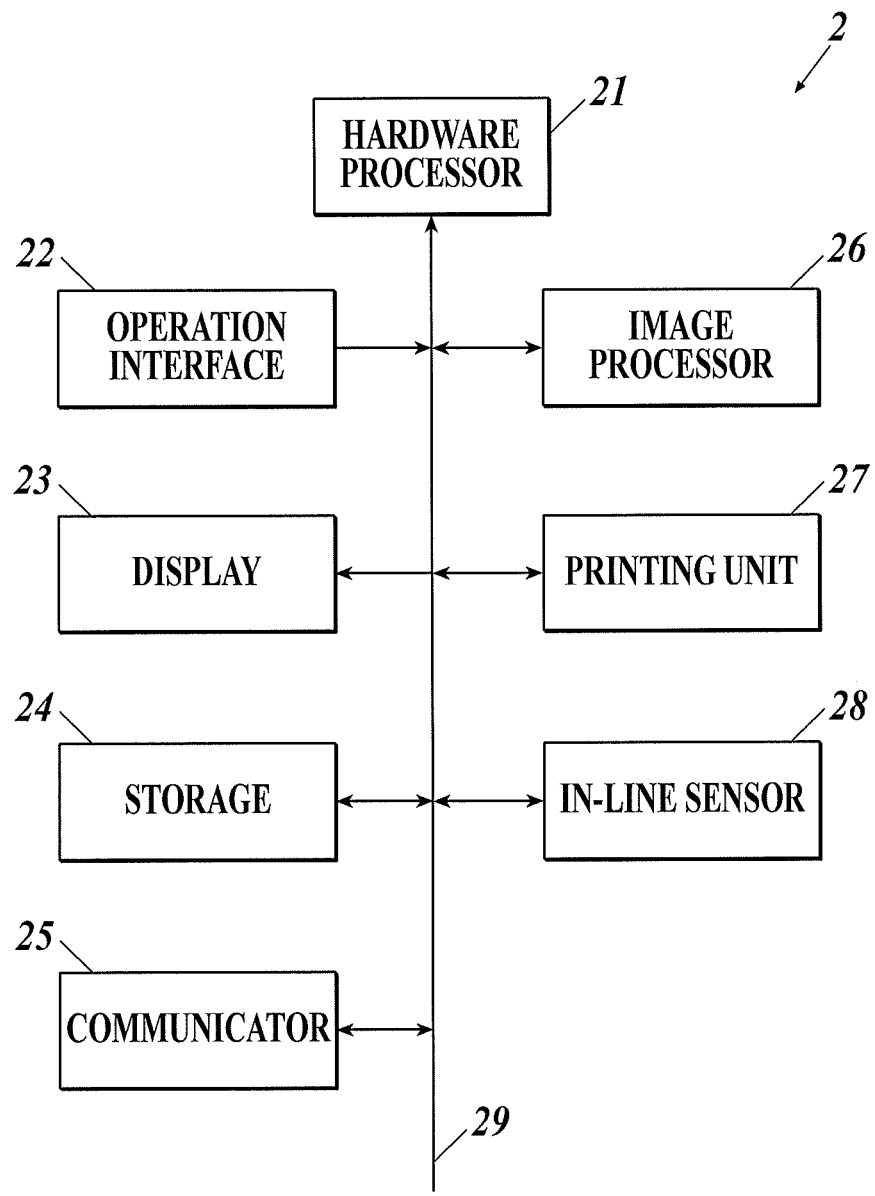
FIG. 3 is a block diagram of the functional configuration of a printer in FIG. 1.

FIG. 3 is a block diagram of the functional configuration of the printer 2. As illustrated in FIG. 3, the printer 2 includes a hardware processor 21, an operation interface 22, a display 23, a storage 24, a communicator 25, an image processor 26, a printing unit 27, an in-line sensor 28 and the like, which are connected to each other via a bus 29.

The hardware processor 21 includes a CPU, a RAM and the like. In response to an operation on the operation interface 22, the CPU of the hardware processor 21 reads a system program and a variety of processing programs stored in the storage 24, develops them in the RAM and performs a variety of processing according to the developed programs.

The operation interface 22 includes an input device such as operation keys and a touch panel overlaid on the display 23. The operation interface 22 converts an operation on the input device to an operation signal and outputs it to the hardware processor 21.

The display 23, which includes an LCD, displays a variety of operation windows and a variety of processing results according to an instruction from the hardware processor 21.

The storage 24 includes a storage device such as a non-volatile semiconductor memory or a hard disk. In the storage 24, a variety of programs to be executed by the hardware processor 21, parameters required for executing the programs and data such as processing results are stored.

For example, a program for printing an image with the printing unit 27 based on printing image data sent from the PC 1, programs for adjusting the color reproducibility of the printer 2 such as multidimensional calibration, one-dimensional calibration, maximum density adjustment, gray balance calibration and tone curve adjustment are stored in the storage 24.

The communicator 25, which includes a communication control card such as a LAN card, sends and receives data to and from an external device such as the PC 1 via the communication network N.

The image processor 26 performs a variety of correction processing that applies a LUT (Look Up Table) or a curve generated by multidimensional calibration, one-dimensional calibration, maximum density adjustment, gray balance calibration or tone curve adjustment, and image processing such as compression and expansion on printing image data, and outputs it to the printing unit 27.

The printing unit 27 prints an image on a sheet by an electrophotographic process or an inkjet process based on the image data input from the image processor 26. An image that is printed on a sheet by the printing unit 27 is referred to as a printed image.

The in-line sensor 28 is disposed in the downstream in the sheet conveyance direction of the printing unit 27. The in-line sensor 28 optically reads the image on the sheet printed by the printing unit 27 and outputs the read value (colorimetric value) to the hardware processor 21.

Operation of Color Adjustment System 100

The operation in the embodiment will be described.

In the PC 1, when the operation interface 12 receives an instruction of printing an image of image data, the hardware processor 11 performs image processing on the printing image data, such as color conversion to apply the color conversion profile 142 to the image data, and sends it to the printer 2 through the communicator 15. In the printer 2, when it receives the image data through the communicator 25, the image processor 26 performs image processing on the received image data, and the printing unit 27 prints an image on a sheet based on the image data on which the image processing has been performed.

The user visually checks the printed image. When the user finds a color to be corrected, he/she can adjust the color by designating it and inputting an adjustment value on a designated color adjustment window 131.

Figure 4:
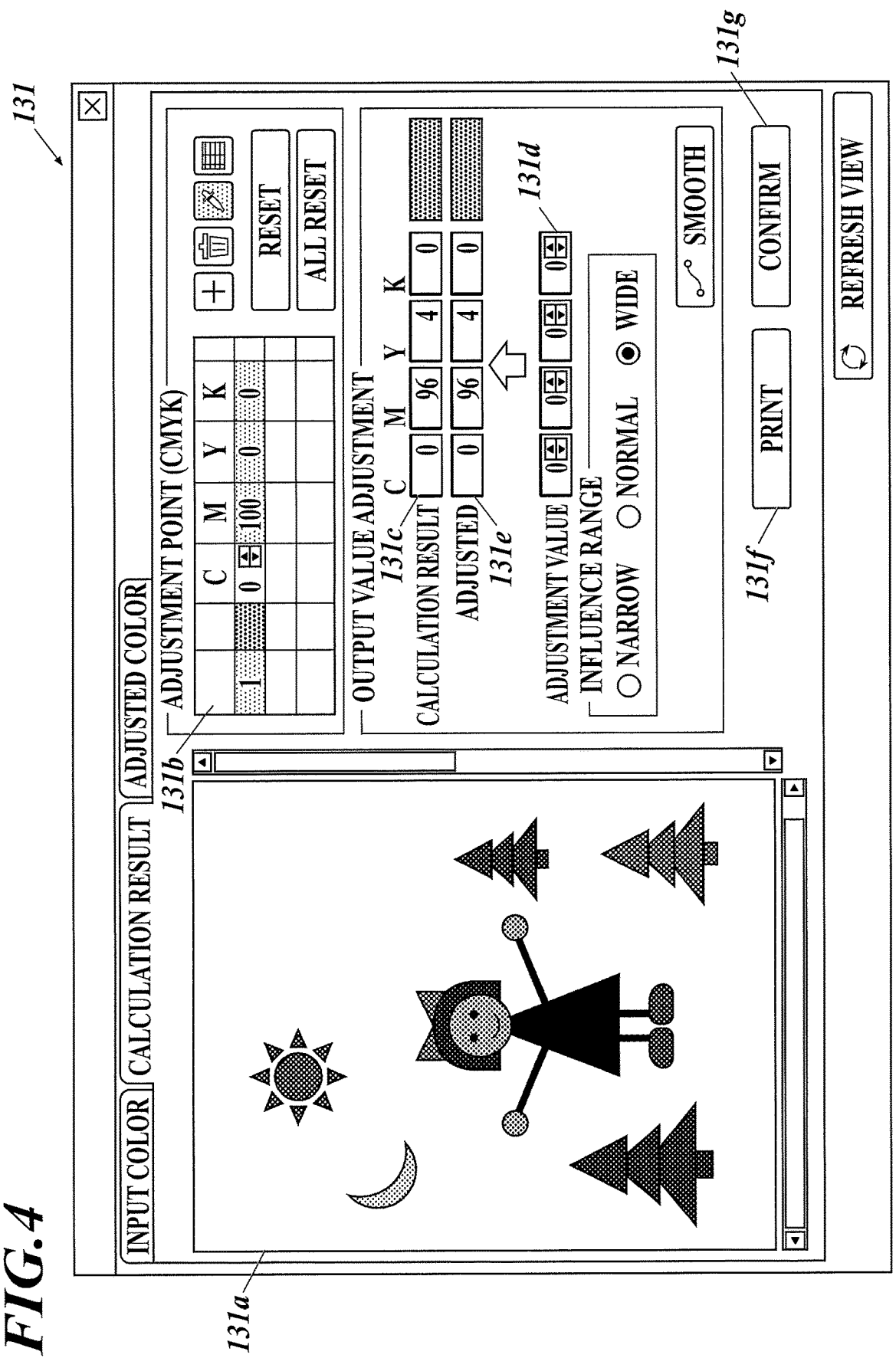
FIG. 4 illustrates an example of a designated color adjustment window.

FIG. 4 is an example of the designated color adjustment window 131. As illustrated in FIG. 4, the designated color adjustment window 131 includes a preview image area 131a, an adjustment point display area 131b, a calculation result area 131c, an adjustment value input area 131d, an adjustment result display area 131e, a print button 131f and a confirm button 131g.

In the preview image area 131a, a preview of the image to be printed is displayed. The user can designate a color to be adjusted by designating (e.g. clicking) a point (adjustment point) of a desired color on the preview image through the operation interface 12. When the user designates an adjustment point in the preview image area 131a, the color and the CMYK values of the designated adjustment point are displayed in the adjustment point display area 131b. When the user designates two or more adjustment points on the preview image, two or more rows of the color and the CMYK values corresponding to the adjustment points are displayed in the adjustment point display area 131b. When the user finishes designating adjustment points and then selects a desired row from the displayed rows through the operation interface 12, the color in the selected row is set as a target for inputting an adjustment value. The user sequentially selects the rows in the adjustment point display area 131b and inputs adjustment values.

When the user selects one of the rows in the adjustment point display area 131b, the converted CMYK values (theoretical values) at the selected adjustment point, which have been converted by color conversion based on the color conversion profile 142, and the color sample thereof are displayed in the calculation result area 131c. When the user inputs an adjustment value of the CMYK values in the adjustment value input area 131d, the calculated values to which the input adjustment value has been added and the color sample thereof are displayed in the adjustment result display area 131e. The user sequentially selects the rows in the adjustment point display area 131b to input adjustment values for the respective adjustment points.

When the user presses the print button 131f, color conversion is performed on the printing image data based on the color conversion profile 142 that has been tentatively corrected based on the input adjustment value, and the printer 2 performs tentative printing. The user can check the adjusted printed image on which the color adjustment has been performed. When the user presses the confirm button 131g, the input adjustment values are confirmed, and the color conversion profile 142 is corrected based on the confirmed adjustment values. The corrected color conversion profile 142 is applied to the printing image data so that image conversion processing is performed. In this way, color adjustment can be performed on the printing image data.

The designated color and the unconfirmed adjustment values input in the designated color adjustment window 131 are stored in the RAM of the hardware processor 11 until the user deletes them or closes the designated color adjustment window 131.

In this way, the user can perform designated color adjustment. However, such a designated color adjustment takes a lot of time and labor, in which the user designates colors to be adjusted one by one in the designated color adjustment window 131, inputs adjustment values of the respective designated colors one by one and prints an image to check the color. When the result is not satisfactory, the user repeats correcting the adjustment values or adding another designated color and inputting an adjustment value.

One of the reasons the printed color is not satisfactory for the user is that the printer 2 sometimes has poor color reproducibility because the printer 2 is not sufficiently adjusted to have required color reproducibility (i.e. adjustment of the color reproducibility is insufficient). In such cases, it is sometimes possible to achieve a satisfying printed color for the user by correctly adjusting the color reproducibility of the printer 2 without making designated color adjustment in which the user designates colors one by one.

In the designated color adjustment processing of the embodiment, a recommendation for adjustment of the color reproducibility of the printer 2 is made depending on the number of colors designated by the user for color adjustment or the features of the designated colors. This allows avoiding an unfruitful designated color adjustment and thereby reducing the time and labor for the designated color adjustment.

Figure 5:
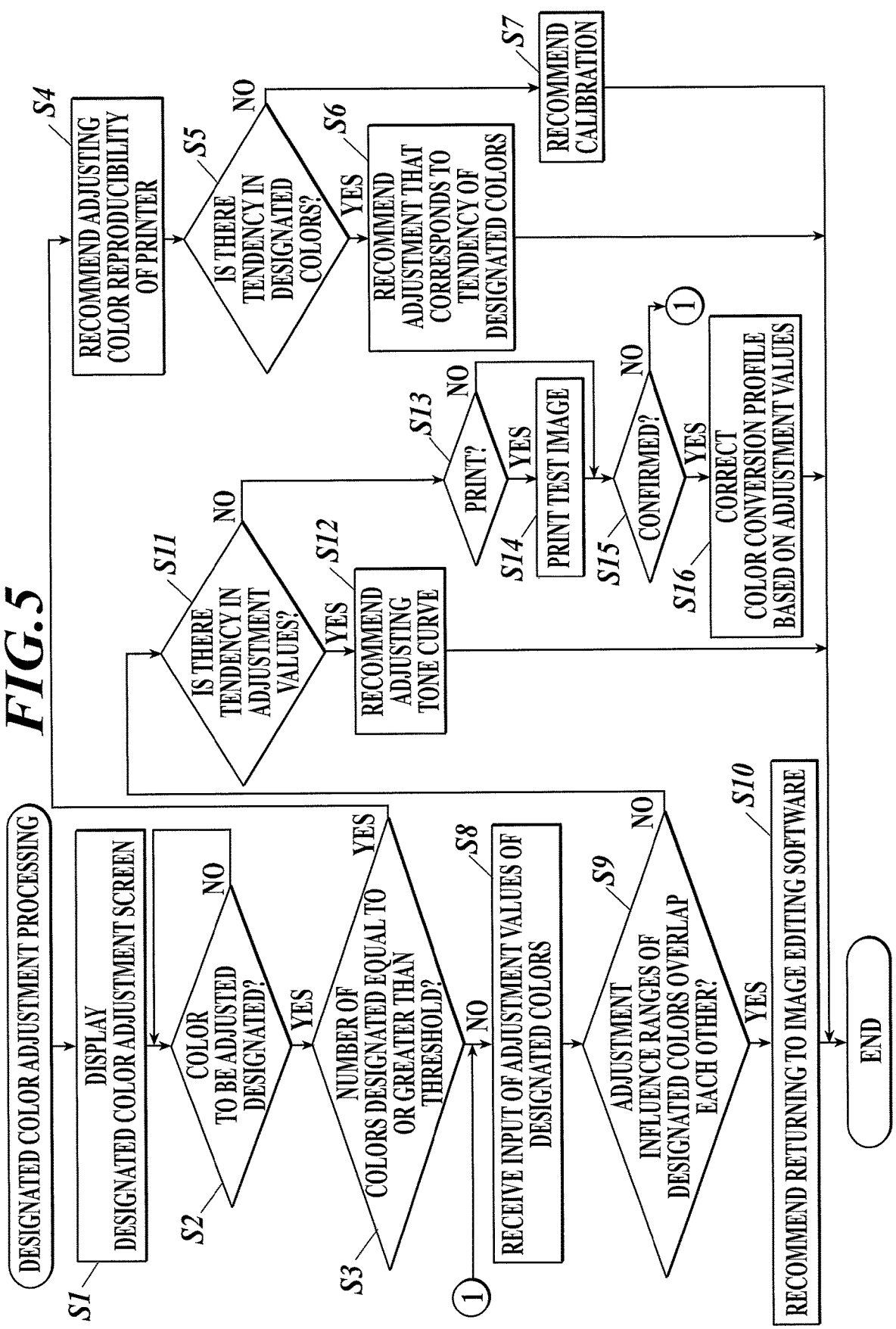
FIG. 5 is a flowchart of designated color adjustment processing.

FIG. 5 is a flowchart of the designated color adjustment processing that is performed by the hardware processor 11 of the PC 1. The designated color adjustment processing is performed by the hardware processor 11 in cooperation with the designated color adjusting application 141 stored in the storage 14 when the user makes an instruction to make a designated color adjustment through the operation interface 12.

First, the hardware processor 11 displays the designated color adjustment window 131 on the display 13 (Step S1).

Then, the hardware processor 11 waits until the user designate a color to be adjusted (adjustment point) in the print preview of an image displayed on the preview image area 131a through the operation interface 12 (Step S2). If it is determined that a color to be adjusted is designated in the preview image area 131a (Step S2, Yes), the hardware processor 11 makes a determination as to whether or not the number of colors designated is equal to or greater than a predetermined threshold (e.g. 10) (Step S3).

If it is determined in Step S3 that the number of colors designated is equal to or greater than the predetermined threshold (Step S3, Yes), the hardware processor 11 displays a message window on the display 13 to recommend adjusting the color reproducibility of the printer 2 (Step 4).

The number of colors designated for adjustment being equal to or greater than the predetermined threshold means that there are a lot of colors in the printed image output by the printer 2 that are not satisfactory for the user. In this case, there is a possibility that the color reproducibility of the printer 2 has not been correctly adjusted in the first place, and the color stability of the printer 2 is low. For this reason, if the hardware processor 11 determines that the number of colors designated is equal to or greater than the predetermined threshold, it displays a message on the display 13 to recommend adjusting the color reproducibility of the printer 2. By prompting the user to adjust the color reproducibility of the printer 2, it is possible to avoid unfruitful designated color adjustment and thereby to reduce the time and labor.

Then, the hardware processor 11 makes a determination as to whether there is a tendency in the designated colors (Step S5). For example, it makes a determination as to whether there is a tendency of the designated colors being a solid single color (one of C, M, Y and K), a solid secondary color (combination of two of C, M and Y), gray (an achromatic color) or the like.

When there is a tendency in the designated colors (Step S5, Yes), the hardware processor 11 displays a message window on the display 13 to recommend an adjustment that corresponds to the tendency of the designated colors (Step S6). Then, the designated color adjustment processing ends.

In step S6, for example, if the designated colors are a solid single color, the hardware processor 11 displays a message window on the display 13 to recommend maximum density adjustment. If the designated colors are a solid secondary color, the hardware processor 11 displays a message window on the display 13 to recommend a multidimensional calibration. If the designated colors are gray, the hardware processor 11 displays a message window on the display 13 to recommend a gray balance calibration.

If it is determined that there is no tendency in the designated colors (Step S5, No), the hardware processor 11 displays a message window on the display 13 to recommend calibration (one-dimensional calibration) (Step S7). Then, the designated color adjustment processing ends.

Based on whether there is a tendency in the designated colors or on the type of existing tendency of the designated color, the hardware processor 11 recommends the type of adjustment that should be made for the printer 2 (i.e. selects the type of adjustment to be recommended). Therefore, the user can readily understand the type of adjustment that should be made. This can reduce the time and labor for the designated color adjustment.

The maximum density adjustment is to adjust the maximum density that the printer 2 can output. The multidimensional calibration is to adjust the color reproducibility of secondary colors of C, M and Y that the printer 2 outputs. The gray balance adjustment is to adjust the gray balance of chromatic colors that the printer 2 outputs. The calibration is to adjust the color reproducibility of each of C, M, Y and K. Each of these adjustments involves printing a chart image that contains patches of different densities by the printing unit 27 of the printer 2, reading the chart image by the in-line sensor 28 to obtain colorimetric values of the patches and generating an LUT or a curve for the adjustment based on the obtained colorimetric values.

If it is determined in Step S3 that the number of colors designated is less than the predetermined threshold (Step S3, No), the hardware processor 11 receives input of adjustment values of the designated colors (Step S8).

Then, the hardware processor 11 makes a determination as to whether the adjustment influence ranges of the designated colors overlap with each other (Step S9).

In designated color adjustment, if only the designated color is changed, the degraded continuity to the surrounding colors causes a tone jump. To avoid the occurrence of tone jump in the designated color adjustment, not only the designated color but also the surrounding colors within a predetermined range from the designated color are adjusted. The range of the surrounding colors to be adjusted along with the designated color is referred to as an adjustment influence range. In the embodiment, colors within a predetermined range (e.g. ±3) from a designated color in the L*a*b* color space are also adjusted along with the designated color. In step S9, if at least a part of the adjustment influence range of one designated color is within a predetermined range of another designated color in the L*a*b* color space, it is determined that the adjustment influence ranges of the designated colors overlap each other.

If it is determined that the adjustment influence ranges of designated colors overlap each other (Step S9, Yes), the hardware processor 11 displays a message window on the display 13 to recommend returning to an image editing software to correct the printing image data (Step S10). Then, the designated color adjustment processing ends.

When the adjustment influence ranges of designated colors overlap each other, the color adjustment produces an unfavorable result. To avoid this, when the adjustment influence ranges of designated colors overlap each other, the hardware processor 11 recommends returning to the image editing software to correct the original image data. Since the user can return to image editing without making an unfruitful designated color adjustment, it is possible to reduce the time and labor required for the designated color adjustment.

It is preferred that the hardware processor 11 displays in the message window the designated colors whose adjustment influence ranges overlap each other. With this configuration, the user can readily understand the color to be corrected in the original image.

If it is determined that the adjustment influence ranges of the designated colors do not overlap each other (Step S9, No), the hardware processor 11 makes a determination as to whether there is a tendency in the input adjustment values (Step S11).

For example, the hardware processor 11 makes a determination as to whether there is a tendency of all values of one of C, M, Y and K being increased (decreased) or a tendency of comparatively high (low) values of one of C, M, Y and K being increased (decreased).

If it is determined that there is a tendency in the input adjustment values (Step S11, Yes), the hardware processor 11 displays a message window on the display 13 to recommend tone curve adjustment of the printer 2 (Step S12). Then, the designated color adjustment processing ends.

As in the following example, when there is a tendency of adjustment values of cyan being increased in different colors, the hardware processor 11 displays a message window on the display 13 to recommend tone curve adjustment of cyan.

Example

Adjustment value of Color 1 (C, M, Y, K)=(+15, 0, 0, 0)
Adjustment value of Color 2 (C, M, Y, K)=(+10, 0, 0, 0)
Adjustment value of Color 3 (C, M, Y, K)=(+5, 0, 0, 0)

As used herein, tone curve adjustment is to adjust the input-output density curve (tone curve) of each of C, M, Y and K of the printer 2. By tone curve adjustment, it is possible to correct the shape of a tone curve to change the overall brightness, the contrast and the color tone of a target color component.

As described above, the hardware processor 11 displays a message window on the display 13 to recommend tone curve adjustment of the printer 2 if it is determined that there is a tendency in the input adjustment values. This allows avoiding manually adjusting colors one by one by designated color adjustment when there is a tendency in the adjustment values thereof and thereby reducing the time and labor for the designated color adjustment.

If it is determined that there is no tendency in the adjustment values (Step S11, No), the hardware processor 11 makes a determination as to whether the user presses the print button 131f through the operation interface 12 (Step S13).

If it is determined that the user presses the print button 131f (Step S13, Yes), the hardware processor 11 sends the adjusted printing image data to the communicator 15, on which color adjustment has been made based on the input adjustment values, and controls the printer 2 to print a test image (Step S14).

Then, the hardware processor 11 makes a determination as to whether the user presses the confirm button 131g through the operation interface 12 (Step S15).

If it is determined that the user does not press the confirm button 131g (Step S15, No), the processing returns to Step S8, and the hardware processor 11 repeats Step S8 and the following steps.

If it is determined that the user presses the confirm button 131g (Step S15, Yes), the hardware processor 11 corrects the color conversion profile 142 based on the input adjustment values (Step S16). Then the designated color adjustment processing ends.

In the designated color adjustment processing, when the hardware processor 11 recommends adjusting the color reproducibility of the printer 2, the user operates the operation interface 12 to display an adjustment window for making the recommended adjustment on the display 13 and makes the recommended adjustment. However, the user may sometimes want to avoid a trouble of manually making the recommended adjustment.

Figure 6:
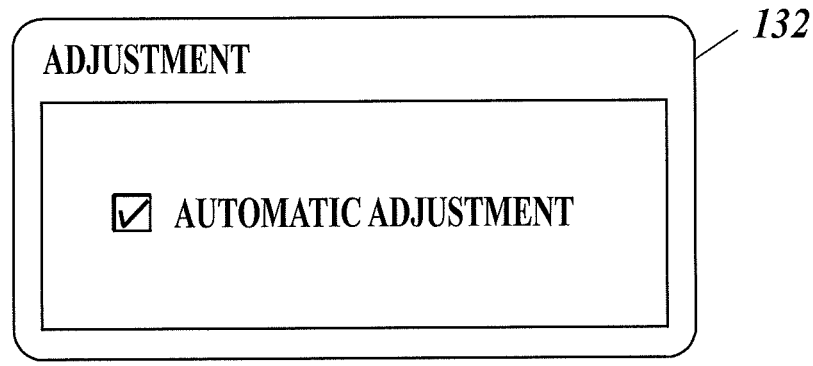
FIG. 6 illustrates an example of a setting window.

For this reason, the hardware processor 11 may automatically make the recommended adjustment of the printer 2 that is recommended in Step S6, Step S7 or Step S12 of the designated color adjustment processing in FIG. 5. For example, as illustrated in FIG. 6, when the user selects automatic adjustment of the printer 2 in the setting window 132 of the designated color adjusting application 141, the hardware processor 11 stores the setting of automatically making the adjustment recommended in the designated color adjustment processing in the storage 24. When the automatic execution of the recommended adjustment is enabled in the designated color adjustment processing, the hardware processor 11 sends an instruction to adjust the color reproducibility of the printer 2 to the printer 2 through the communicator 15 so as to automatically make the recommended adjustment after it recommends the adjustment in Step S6, Step S7 or Step S12 of the designated color adjustment processing.

For example, when the hardware processor 21 of the printer 2 receives an instruction to make one of maximum density adjustment, multidimensional calibration, gray balance calibration, calibration (one-dimensional calibration) from the PC 1 through the communicator 25, it makes the instructed adjustment. For example, the hardware processor 21 controls the printing unit 27 to output a chart for the instructed adjustment and controls the in-line sensor 28 to read patches of the output chart. Based on the read colorimetric values of the patches, the hardware processor 21 makes the instructed adjustment (generates an LUT or a curve). When the hardware processor 21 receives an instruction to adjust the tone curve, it retrieves the adjustment values input in the designated color adjustment processing from the PC 1 and adjusts the tone curve based on the tendency of the retrieved adjustment values.

When the hardware processor 11 controls the printer 2 to adjust the tone curve, it may also send the printing image data to the printer 2 so that the printer 2 applies the adjusted tone curve to the printing image data and prints a test image that is based on the adjusted image data.

Since the recommended adjustment is automatically made in the printer 2, it is possible to avoid the trouble of manually making the recommended adjustment.

Second Embodiment

A second embodiment of the present invention will be described.

Figure 7:
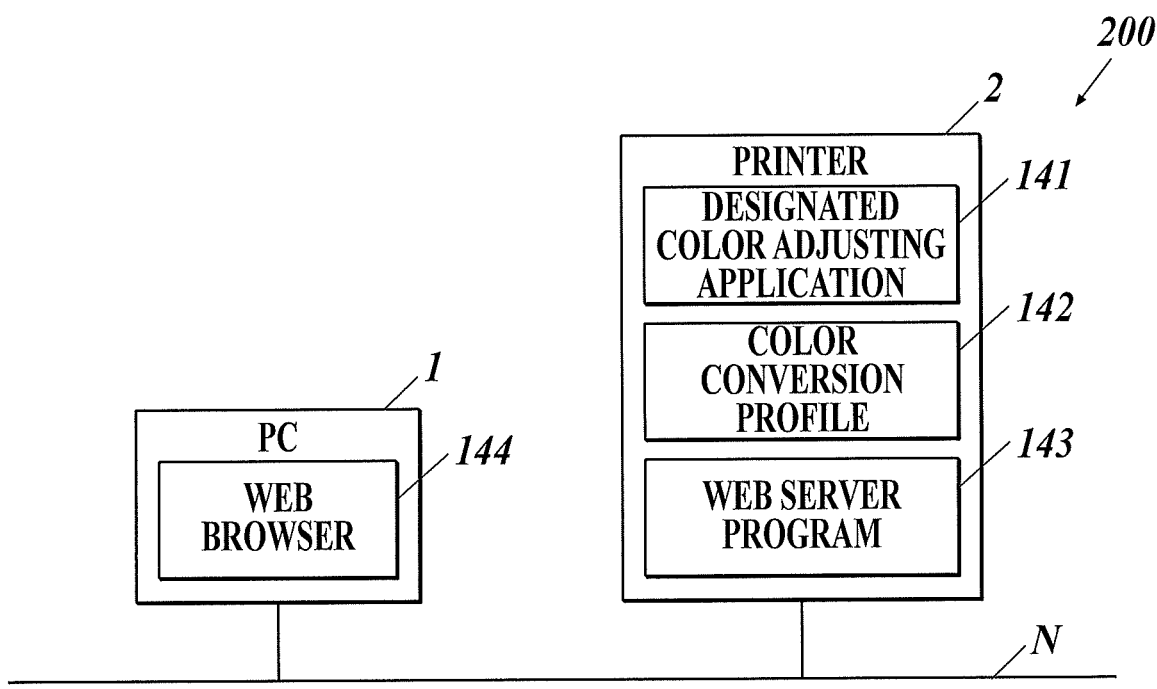
FIG. 7 illustrates an example of the overall configuration of a color adjustment system according to a second embodiment.

FIG. 7 illustrates an example of the overall configuration of a color adjustment system 200 according to the second embodiment of the present invention.

As illustrated in FIG. 7, the color adjustment system 200 of the second embodiment is configured such that a designated color adjusting application 141 and a color conversion profile 142, which are stored in the PC 1 in the first embodiment, and a Web (world wide web) server program 143 are stored in a storage 24 of a printer 2, and a Web browser 144 is stored in a storage 14 of the PC 1. The other configuration of the PC 1 and the printer 2 is the same as that of the first embodiment, and the description thereof applies to this embodiment.

In the color adjustment system 200, when the user accesses to the URL (Uniform Resource Locater) of the designated color adjusting application 141 of the printer 2 from the PC 1 by using the Web browser 144, a hardware processor 21 of the printer 2 performs the designated color adjustment processing as illustrated in FIG. 5 in cooperation with the designated color adjusting application 141 and the Web server program 143. To display a designated color adjustment window 131 on a display 13 in the designated color adjustment processing, a hardware processor 21 serves as a Web server to send window data representing the designated color adjustment window 131 to the PC 1 through the communicator 25, and the Web browser 144 displays the designated color adjustment window 131 on the display 13. Then, the Web browser 144 receives a user operation such as designation of a color to be adjusted, input of the adjustment value thereof, confirmation and execution of printing through the designated color adjustment window 131. To display a message window that recommends printer adjustment on the display 13, the hardware processor 21 sends window data representing the message window to the PC 1 through the communicator 25 so that the Web browser 144 displays the designated color adjustment window 131 on the display 13.

That is, in the second embodiment, the control apparatus of the present invention is achieved by cooperation of the hardware processor 21 of the printer 2 with the designated color adjusting application 141 and the Web server program 143.

As described above, the present invention can also be implemented by the configuration in which the designated color adjusting application 141 is stored in the printer 2, and the user accesses to the designated color adjusting application 141 of the printer 2 from the PC 1 by using the browser to perform the designated color adjustment processing. Further, the same advantageous effects as in the first embodiment can be obtained.

In the second embodiment, a recommended adjustment may also be automatically made as in the first embodiment. In the second embodiment, the printer 2 has a function of a Web server and receives an input from the PC 1 having the Web browser 144 to perform the designated color adjustment processing. However, a server may be provided separately from the printer 2, and the control apparatus may be achieved by cooperation of a hardware processor of the server with the designated color adjusting application 141, the color conversion profile 142 and the Web server program 143.

While the first and second embodiments of the present invention are described, these embodiments are merely suitable examples of the present invention, and the present invention is not limited thereto.

For example, in the above-described embodiments, a determination is made as to whether or not the number of colors designated is equal to or greater than the threshold. If it is less than the threshold, a determination is made as to whether the adjustment influence ranges of the designated colors overlap each other. If it is determined that the ranges do not overlap each other, a determination is made as to whether there is a tendency in adjustment values of the designated colors. However, the determination of whether there is a tendency in the adjustment values of the designated colors may be made without making the determination of the number of colors designated and/or the determination of whether the adjustment influence ranges of the designated colors overlap each other. If it is determined that there is a tendency in the adjustment values of the designated colors, tone curve adjustment may be recommended.

Similarly, in the embodiment, a determination is made as to whether or not the number of colors designated is equal to or greater than the threshold. If it is less than the threshold, a determination is made as to whether the adjustment influence ranges of the designated colors overlap each other. However, the determination of whether the adjustment influence ranges of the designated colors overlap each other may be made without making the determination of the number of colors designated. If it is determined that the ranges overlap each other, a message window may be displayed on the display 13, which recommends returning to an image editing software to correct the printing image data.

In the above description, a non-volatile memory, a hard disk or the like is used as the computer-readable medium of the program according to the present invention. However, the present invention is not limited to these examples. The other computer-readable media that are applicable include portable recording media such as CD-ROM. Further, a carrier wave is also applicable as a medium for providing data representing the program of the present invention through a communication line.

Further, suitable changes can be made in the detailed configuration and the detailed operation of the apparatuses of the color adjustment system without departing from the features of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017-219579, filed on Nov. 15, 2017, is incorporated herein by reference in its entirety.

What is claimed is:

1. A control apparatus which receives designation of one or more colors to be adjusted in a printed image and input of one or more adjustment values of the designated colors, the printed image being an image output by a printer based on printing image data, and which makes a color adjustment of the printing image data based on the designated colors and the input adjustment values, the control apparatus comprising:

a hardware processor which makes a determination as to whether or not a number of the colors designated is equal to or greater than a predetermined threshold, and if it is determined that the number of the colors designated is equal to or greater than the predetermined threshold, recommends adjusting color reproducibility of the printer.

2. The control apparatus according to claim 1, wherein if it is determined that the number of colors designated is less than the predetermined threshold, the hardware processor makes a determination as to whether adjustment influence ranges of the designated colors overlap each other, and if it is determined that the adjustment influence ranges overlap each other, recommends returning to an image editing software to correct the printing image data.

3. The control apparatus according to claim 1, wherein the hardware processor controls the printer to automatically make the recommended adjustment.

4. The control apparatus according to claim 1, wherein if it is determined that the number of colors designated is equal to or greater than the predetermined threshold, the hardware processor makes a determination as to whether there is a tendency in the designated colors, and selects an adjustment to be recommended based on a result of the determination of whether there is a tendency in the designated colors.

5. The control apparatus according to claim 4, wherein if it is determined that there is a tendency in the designated colors, the hardware processor selects the adjustment to be recommended based on the tendency of the designated color.

6. The control apparatus according to claim 1, wherein if it is determined that the number of colors designated is less than the predetermined threshold, the hardware processor makes a determination as to whether there is a tendency in the adjustment values of the designated colors, and if it is determined that there is a tendency in the adjustment values of the designated colors, recommends adjusting a tone curve of the printer.

7. The control apparatus according to claim 6, wherein the hardware processor controls the printer to automatically adjust the tone curve based on the tendency of the adjusted values of the designated colors.

8. The control apparatus according to claim 7, wherein the hardware processor controls the printer to use the adjusted tone curve to print a test image that is based on the printing image data.

9. A computer-readable recording medium storing a program for a computer of a control apparatus which receives designation of one or more colors to be adjusted in a printed image and input of one or more adjustment values of the designated colors, the printed image being an image output by a printer based on printing image data, and which makes a color adjustment of the printing image data based on the designated colors and the input adjustment values, the program making the computer function as:

a determiner which makes a determination as to whether or not the number of the colors designated is equal to or greater than a predetermined threshold; and a recommender which recommends adjusting a color reproducibility of the printer if it is determined by the determiner that the number of the colors designated is equal to or greater than the predetermined threshold.

\* \* \* \* \*